(12) United States Patent
Daum et al.

(10) Patent No.: US 8,497,591 B2
(45) Date of Patent: Jul. 30, 2013

(54) SYSTEM AND METHOD FOR OFF-HIGHWAY VEHICLE ENGINE CRANKING

(75) Inventors: Wolfgang Daum, Erie, PA (US); Ajith Kuttannair Kumar, Erie, PA (US); Bret Worden, Erie, PA (US); Henry Young, Erie, PA (US); Timothy Brown, Erie, PA (US); Jeffrey Wolff, Erie, PA (US)

(73) Assignee: General Electric Company, Schenectady, NY (US)

( * ) Notice: Subject to any disclaimer, the term of this patent is extended or adjusted under 35 U.S.C. 154(b) by 293 days.

(21) Appl. No.: 12/980,388

(22) Filed: Dec. 29, 2010

(65) Prior Publication Data
US 2012/0169050 A1 Jul. 5, 2012

(51) Int. Cl.
B60K 6/20 (2007.10)

(52) U.S. Cl.
USPC .......................................................... 290/31

(58) Field of Classification Search
USPC .......................................................... 290/31
See application file for complete search history.

(56) References Cited

U.S. PATENT DOCUMENTS

| | | | |
|---|---|---|---|
| 1,852,798 A * | 4/1932 | Brandenstein | 290/14 |
| 5,075,616 A * | 12/1991 | Mitsui | 322/10 |
| 5,172,006 A | 12/1992 | Suzuki et al. | |
| 5,334,878 A * | 8/1994 | Vanek et al. | 307/64 |
| 5,589,743 A * | 12/1996 | King | 318/139 |
| 5,848,659 A * | 12/1998 | Karg et al. | 180/65.245 |
| 5,905,360 A * | 5/1999 | Ukita | 320/118 |
| 6,023,137 A | 2/2000 | Kumar et al. | |
| 6,357,545 B1 | 3/2002 | Hori et al. | |
| 6,480,767 B2 * | 11/2002 | Yamaguchi et al. | 701/22 |
| 7,489,093 B2 | 2/2009 | King et al. | |
| 7,689,331 B2 * | 3/2010 | Moran | 701/22 |
| 7,761,198 B2 | 7/2010 | Bhardwaj | |
| 2003/0187553 A1 * | 10/2003 | Dillen et al. | 701/19 |
| 2007/0124037 A1 * | 5/2007 | Moran | 701/22 |
| 2009/0146612 A1 * | 6/2009 | Oyobe et al. | 320/138 |
| 2009/0179601 A1 * | 7/2009 | Evans et al. | 318/149 |
| 2009/0230683 A1 | 9/2009 | Bass | |
| 2009/0315328 A1 | 12/2009 | Kumar | |
| 2009/0325328 A1 | 12/2009 | Samukawa et al. | |

\* cited by examiner

*Primary Examiner* — Joseph Waks
(74) *Attorney, Agent, or Firm* — John A. Kramer; GE Global Patent Operation

(57) ABSTRACT

Methods and systems are provided for operating an engine, the engine coupled to a traction alternator for vehicle travelling. In one example, the method includes, in an off-highway vehicle running mode of operation, supplying current from the traction alternator to a traction motor via a traction inverter to propel the vehicle, and, in a starting mode of operation, supplying stored energy from a first energy source and a secondary energy source to the traction alternator to start the engine.

24 Claims, 11 Drawing Sheets

SYSTEM AND METHOD FOR OFF-HIGHWAY VEHICLE ENGINE CRANKING

FIELD

The subject matter disclosed herein relates to systems and methods for improving engine cranking in off-highway vehicles.

BACKGROUND

Vehicles, such as off-highway vehicles (OHVs), include various systems for cranking the engine in order to assist engine starting. The starting systems may utilize an engine starter motor, or other engine propulsion components. In one example, the propulsion system includes a battery that provides direct current (DC) power to an inverter that converts the DC power into a controlled frequency alternating current (AC) power. The AC power is then supplied to an alternator that generates rotation of a rotor, which when coupled with the crankshaft of the engine, rotates the crankshaft for engine starting.

However, the inventors herein have recognized OHVs may have traction alternators, and it may be advantageous to utilize the traction alternator for engine cranking. For example, traction alternators can be supplied with a high current, as compared to a starter motor or an alternator which powers lights, pumps, etc. when the engine is running. As such, the higher current can be converted into a higher mechanical energy to crank the engine.

BRIEF DESCRIPTION

In one approach, a method of operating an engine, the engine coupled to a traction alternator for vehicle travelling and an auxiliary alternator, is disclosed. The method comprises, in an off-highway vehicle running mode of operation, charging a battery at a first voltage from the auxiliary alternator while supplying current from the traction alternator to a traction motor to propel the vehicle, and, in a starting mode of operation, generating a second, higher voltage, from stored energy to drive the traction alternator to at least assist in starting the engine. For example, the second, higher voltage may be generated by increasing an output of the battery via a DC-to-DC converter. In this manner, the battery may be charged via the auxiliary alternator at a lower voltage, and the battery may supply the traction alternator with the second, higher voltage to crank the engine.

In another example, in an off-highway vehicle running mode (e.g., running mode) of operation, current is supplied from the traction alternator to a traction motor via a traction inverter to propel the vehicle, and, in a starting mode of operation, stored energy is supplied from a first energy source and a secondary energy source to the traction alternator to start the engine. For example, the first energy source may be a relatively low voltage battery electrically coupled to the engine which provides electricity for lights, pumps, etc., and the secondary energy source may be an ultracapacitor which can deliver a higher current than the battery.

In one example, the first energy source, which outputs a lower voltage than the secondary energy source, may charge the secondary energy source during the running mode of operation via a DC-to-DC converter. In other examples, the secondary energy source may be further charged via the traction alternator during the running mode of operation. In this way, the secondary energy source may provide a supply a high current on demand for the traction alternator during engine cranking. Further, the charge level of the secondary energy source may decrease at a slower rate since it can be charged via the battery. As such, engine starting may occur even if the battery is degraded, for example.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
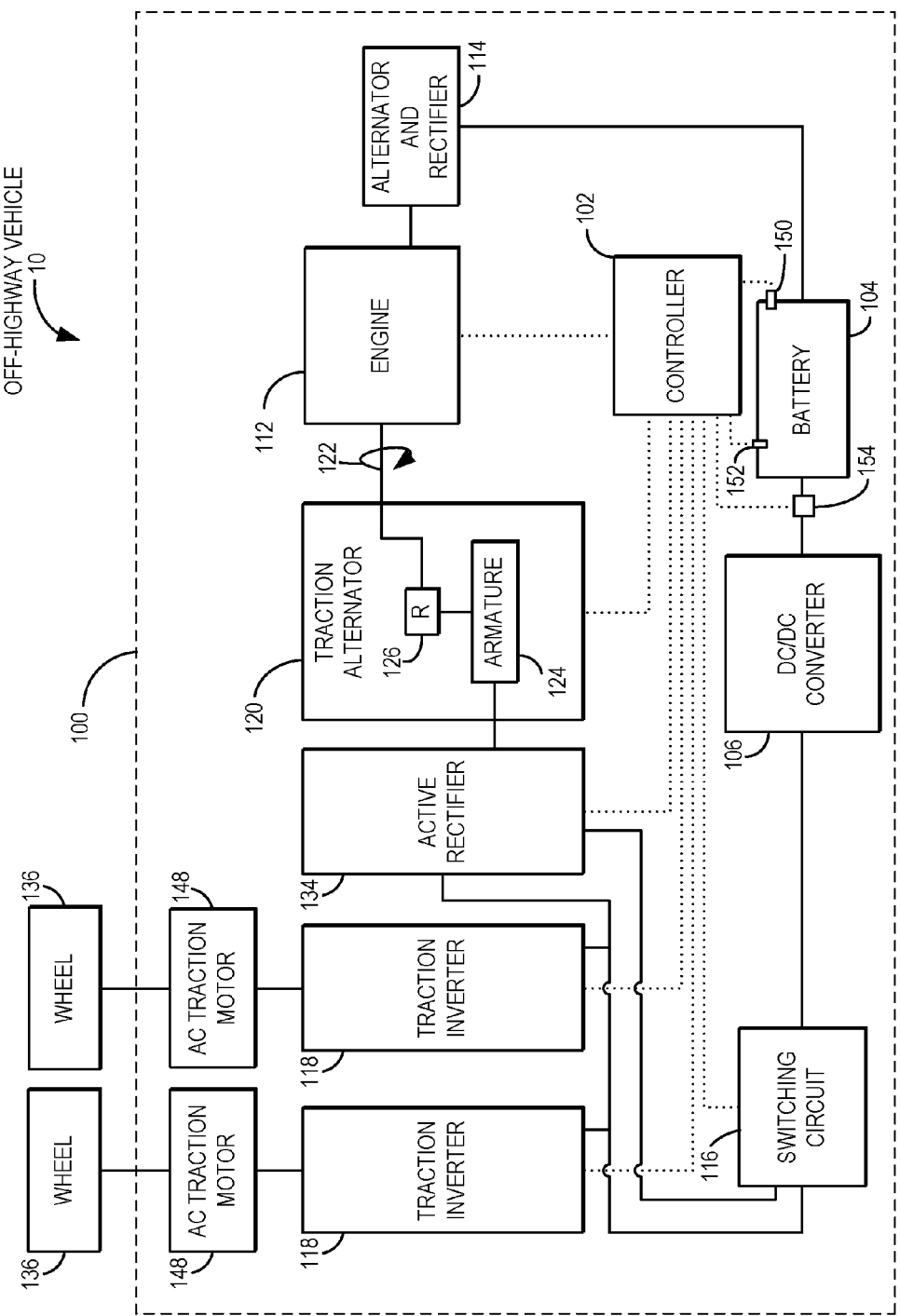
FIG. 1 shows an example block diagram of an engine system with a voltage boost.

The following description relates to various embodiments of an engine system that is started via a traction alternator mechanically coupled to the engine. Various approaches may be used to supply the traction alternator with an appropriate level of current to crank the engine. In one embodiment, a battery is electrically coupled to a DC-to-DC converter which boosts the output of the battery. The output of the battery may be converted to AC for the traction alternator via a traction inverter (which converts DC to AC for traction motors to propel the vehicle), an active rectifier, or an inverter that is separate from the traction inverter, as described with reference to FIGS. 1-4.

In another embodiment, as described with reference to FIGS. 5 and 6, the engine system further includes a secondary energy source such as an ultracapacitor which outputs a higher voltage than the battery and which may be charged via the battery. In this way, a relatively high level of charge may be stored such that the engine may be started quickly, for example.

In another embodiment, the secondary energy source is charged via the traction alternator during a running mode of operation of the engine, as described with reference to FIGS. 7 and 8. As such, the secondary energy source may receive energy from two sources (the traction alternator and the battery) and a high level of charge can be maintained in the secondary energy source.

In yet another embodiment, as described with reference to FIGS. 9 and 10, the engine is coupled to a hydraulic system. The hydraulic system may provide another source of energy for the battery and the secondary energy source during the engine starting mode of operation. In this way, even if a charge level of the secondary energy source is too low for engine cranking, the secondary energy source may be charged before engine cranking so that the engine may start.

A routine for shutting down an engine with a secondary energy source is described with reference to FIG. 10.

Referring now to the drawings, like reference numerals are used to identify similar components in the various views. FIGS. 1-3, 5, 7, and 9 refer to an engine system with an electric storage battery 104, traction inverters 118, a traction alternator 120 with an armature 124, a rotor ("R") 126, and field winding (not shown), and an engine 112.

Referring now specifically to FIG. 1, it shows the first embodiment of an engine system 100 of an off-highway vehicle 10, which includes a voltage boost, and which adjusts engine torque levels by continuous field shunting.

The engine system 100 comprises a controller 102, a prime mover or engine 112, a first energy source, which is an electric storage battery 104, a traction inverter 118, and a traction alternator 120. The electric storage battery 104 supplies electrical energy for starting the engine 112. The engine 112 may be started by generating an alternator torque 122, which drives the crankshaft of the engine 112, as will be described in greater detail below.

The electric storage battery 104 may be a lead-acid or nickel-cadmium type, for example. The electric storage battery 104 may provide an output voltage of 24 volts, depending on various parameters, including its state of charge, temperature, current draw, etc. As an example, the controller 102 may estimate a state of charge and/or health of the battery 104 based on input from sensors 150, 152, and 154 coupled to the battery 104 and in communication with controller 102 for indicating a temperature, voltage, and output current of the battery, for example. Further, during a running mode of operation electric storage battery 104 is charged by the engine via auxiliary alternator (alternator and rectifier) 114, and provides power to various components of the vehicle, such as lights, pump, air-conditioning, etc.

As shown the example embodiment of in FIG. 1, when the switching circuit 116 is closed, the DC supplied by the electric storage battery 104 is converted to AC and supplied to the traction alternator 120 by the active rectifier 134 when the active rectifier 134 is made active (e.g., when the switching circuit 116 is open). Further, the active rectifier 134 converts AC supplied by the traction alternator 120 to DC which is supplied to the traction inverters 118. The active rectifier 134 and/or the traction inverters 118 may comprise at least three legs, where each leg may include at least two insulated gate bipolar transistors (IGBT). For example, out of the six IGBTs, at least two are open during circuit operation so that two phases are firing at a time. Furthermore, the output of the electric storage battery 104 is boosted via DC-to-DC converter 106. As such, DC supplied to the traction alternator may be increased to a desired level for engine cranking, as well as regulated by the DC-to-DC converter 106.

In one example, the engine 112 may be a thermal or an internal-combustion engine such as a 2500 horsepower, diesel engine that is used to provide the motive power on an off-highway vehicle. In one example, the traction alternator 120 may perform two modes of operation: during a starting mode of operation (e.g., engine cranking), the traction alternator 120 may be an AC motor that drives the crankshaft to start the engine 112; after engine cranking, the traction alternator 120 may be a synchronous generator, which supplies alternating current to an electric load circuit that is connected to its armature winding 124. For example, the portion of the active rectifier 134 that converts DC to AC to operate the traction alternator 120 as an AC motor is switched out of the circuit when the engine is started such that the active rectifier 134 only supplies the traction inverters 118 with DC.

In the engine starting mode of operation as shown in FIG. 1, the rotor "R" 126 of the traction alternator 120 drives the crankshaft of the engine 112. The electric energy supplied from the heavy duty electric storage battery 104 by the traction inverter 118 to the traction alternator 120 is converted into mechanical energy of the rotor 126. The rotor 126 thus exerts torque (122) to turn the crankshaft and thereby crank the engine. As the rotor "R" 126 accelerates, the engine speed (revolutions per minute, RPM) increases and the back EMF generated in the armature 124 correspondingly increases, while load current (e.g., current in the cranking circuit of FIG. 1) decreases in magnitude. Once the rotor is rotating faster than a predetermined rate, typically about 200 rpm, the engine is presumed to be started, and the engine cranking mode of operation is discontinued.

The load current in the circuit thus may directly depend on battery voltage, armature back EMF, and impedance in the circuit including that of the field. The alternator torque 122 generated as a result of accelerating the rotor "R" 126 depends primarily on the field resistance 128 and the back EMF of the alternator. Thus, by shunting the field resistance continuously, it may be possible to adjust alternator torque in real time, and in response to various operating conditions. For example, real time control in a computer controlled system may include repeated and successive adjustment of alternator torque by the system in response to calculations and sensor readings taken throughout operation.

In one example, the continuous field shunting is achieved by connecting an IGBT (not shown) in parallel to the field. The IGBT may be additionally and selectively coupled to, and control, another component of the off-highway vehicle, for example. The other component may include one or more of the following: a radiator fan, an air compressor, a battery charger, a traction field regulator, or an AC traction motor. In this manner, it is possible to utilize an IGBT to provide control of both the field, and thus the traction alternator 120, during cranking, as well as another component that does not operate during cranking, but operates before or after cranking, such as during off-highway vehicle running conditions.

Figure 2:
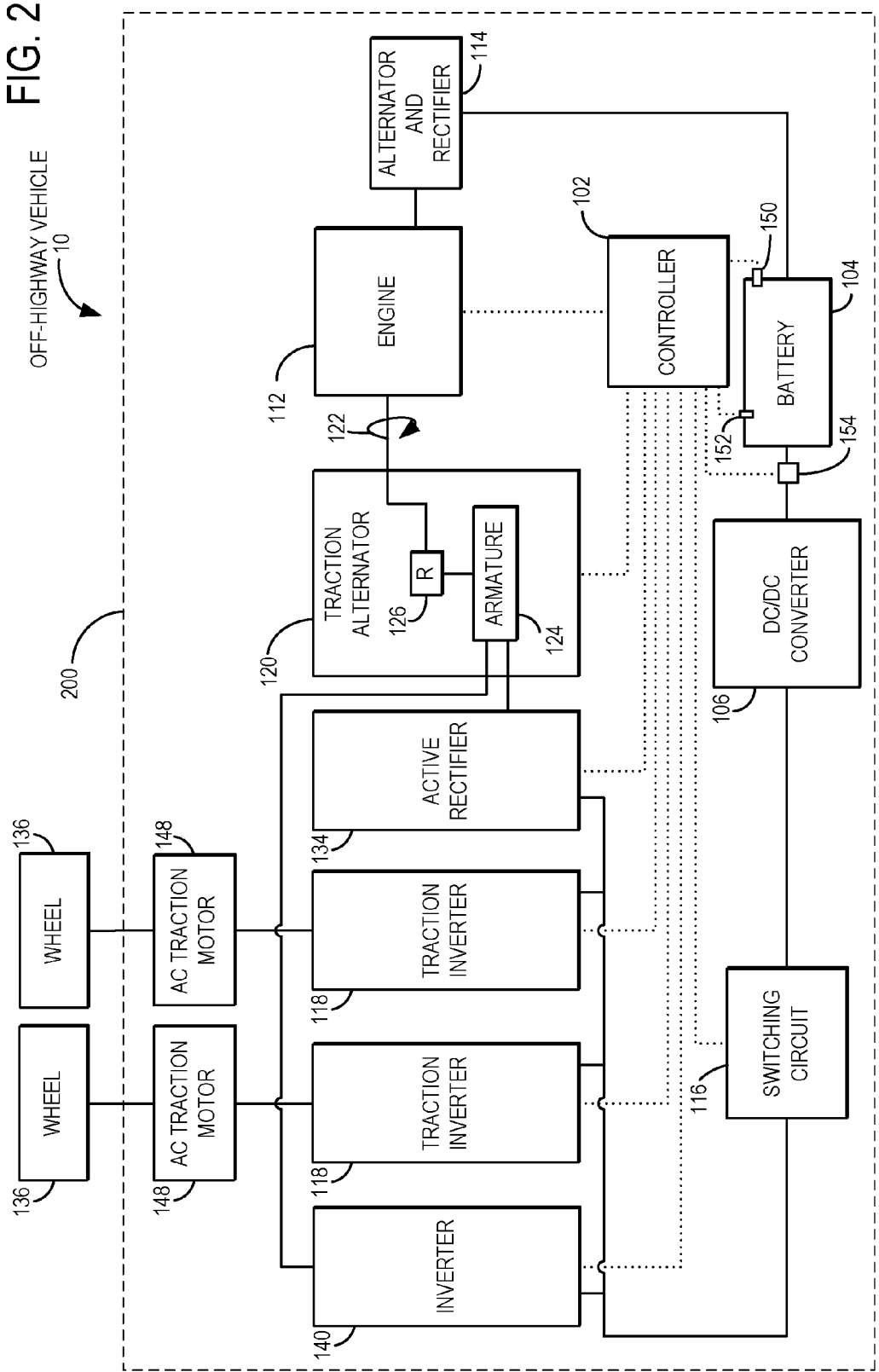
FIG. 2 shows an example block diagram of an engine system in an off-highway vehicle with a voltage boost.

In one example, IGBT may be controlled by controller 102 in response to a desired output torque, a desired speed trajectory, an actual engine speed, and/or various other parameters, as described in further detail herein with regard to FIG. 2. For example, based on a comparison of the actual torque and the desired torque, the IGBT generates a pulse width modulated (PWM) signal to continuously shunt the field via modulating the impedance of the field. In another example, the IGBT may modulate the impedance of a resistor connected in parallel to the field. Thus, torque supplied by a three-phase traction alternator 120 in the starting system may be adjusted in more than two levels (e.g., 3 or more torque levels) via continuous adjustment of field shunting of the alternator.

It may be noted that adjustment of torque among a plurality of levels may also be achieved by connecting a series of resistors in parallel to the field winding, with each of the resistors controlled by a switch. As multiple resistors are connected in parallel to the field, it results in further field weakening and consequently a higher alternator torque. The multiple switches may be in an on-state or an off-state at different times, as adjusted by the controller, in turn allowing a plurality of torque levels during engine cranking.

As noted above, the active rectifier 134 and the IGBT may be used to control and power the traction alternator 120 during cranking, and may also be used to control and power another component of the off-highway vehicle 10 after engine cranking, such as during off-highway vehicle running conditions, for example. Thus, once the engine speed has reached about 200 rpm, for example, and the engine cylinders are firing, the controller 102 identifies the completion of cranking and sends signals to a switching circuit to connect traction inverters 118, which convert DC from the active rectifier 134 to AC, to the AC traction motors 148 to power the wheels 136 of the vehicle, during subsequent engine operation.

In the example embodiment of FIG. 2, engine system 200 further includes inverter 140. During the engine starting mode of operation, the DC supplied by the electric storage battery 104 is converted to AC supplied to the traction alternator 120 by the inverter 140, which is separate from the traction inverters 118. As in the example of FIG. 1, during the engine running mode of operation, the traction alternator 120 provides power to AC traction motors 148 via traction inverters 118. The AC from the traction alternator 120 is converted to DC via the active rectifier 134, and traction inverters 118 convert the DC from the active rectifier 134 to AC.

Figure 3:
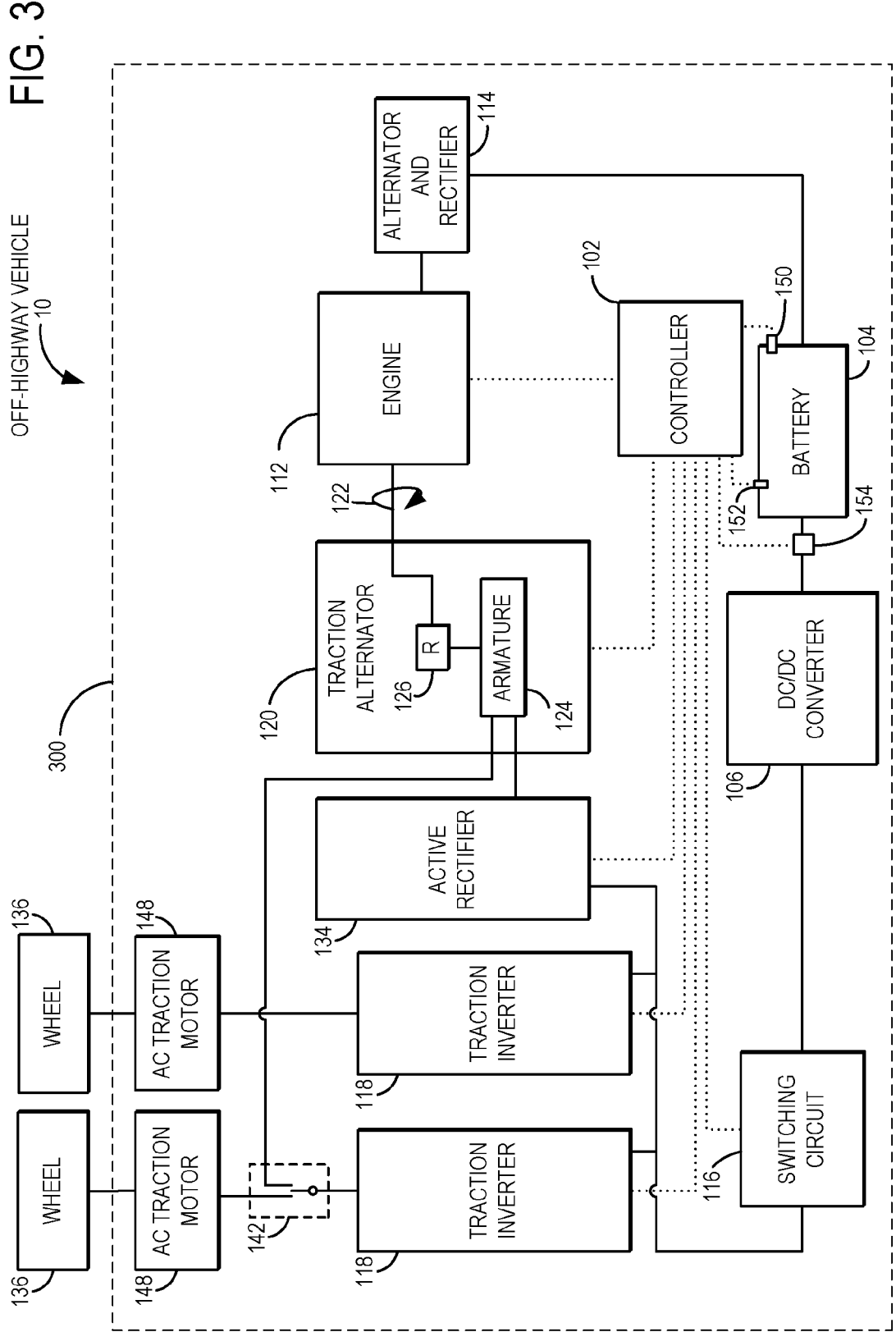
FIG. 3 shows an example block diagram of an engine system in an off-highway vehicle with a voltage boost.

In the example embodiment of FIG. 3, engine system 300 includes a transfer switch 142 in addition to active rectifier 134. In such an embodiment, during the starting mode of operation, transfer switch 142 is adjusted such that AC at a high voltage (which has been converted by traction inverter 118 from DC supplied by the electric storage battery 104) is supplied to the traction alternator 120. During the running mode of operation, transfer switch 142 is adjusted such that the AC traction motor 148 receives current from the traction inverter 118 to power wheels 136, and current is supplied to traction inverters 118 from the traction alternator 120 via the active rectifier 134.

Thus, FIGS. 1-3 show embodiments of engine systems which have an electric storage battery 104 that is boosted by a DC-to-DC converter 106. As described above, in an engine starting mode of operation, the low voltage DC supplied by the electric storage battery may be converted to high voltage DC via the DC-to-DC converter and to high voltage AC for the traction alternator 120 by an active rectifier 134, a separate inverter 140, or by a traction inverter 118. In an engine running mode of operation, AC from the traction alternator 120 is converted to DC by the active rectifier 134 before it is supplied to the traction inverters 118.

For simplicity, FIGS. 4-11 will be described using an engine system that has the basic configuration of the engine system of FIG. 1. It should be understood, however, the engine systems described with reference to FIGS. 4-11 can also have the basic configuration of FIG. 2 or 3.

Figure 4:
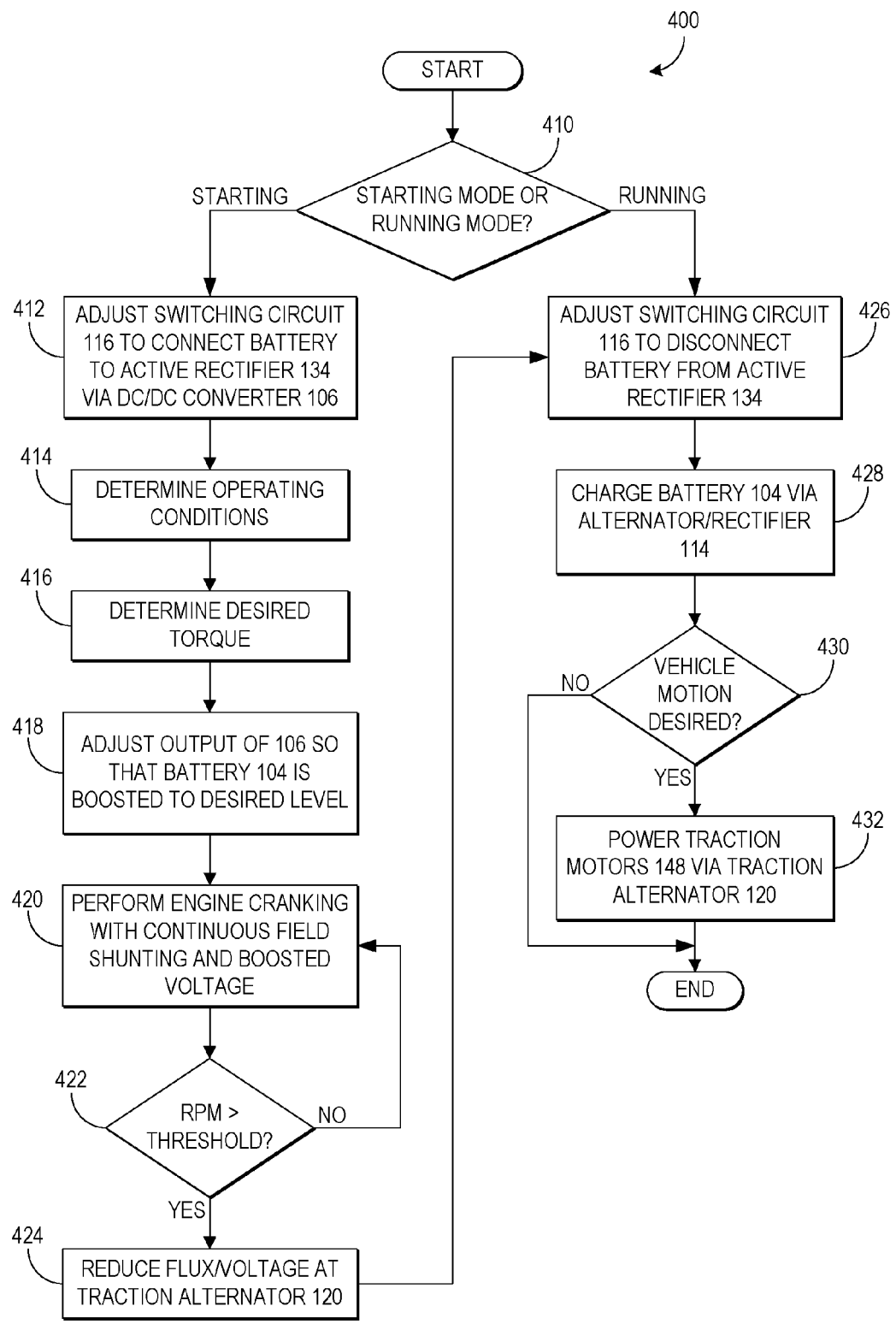
FIG. 4 shows a flow chart illustrating a routine for an engine with a voltage boost.

FIG. 4 depicts a flow chart illustrating an example control routine 400 for an engine with a voltage boost, such as engine system 100 described above. Specifically, the routine 400 determines an operating mode of the engine and adjusts the circuitry such that the traction alternator is used to crank the engine or to supply power to the wheels of the vehicle.

At 410 of routine 400, it is determined if the engine is in a starting mode of operation, such as a cranking mode, or a running mode of operation, such as a travelling mode in which the vehicle is propelled. For example, the engine may already be running or it may be shut down.

If it is determined that the engine is in a starting mode, routine 400 proceeds to 412 where the switching circuit 116 is adjusted (e.g., closed) to connect the battery 104 to the active rectifier 134 via the DC-to-DC converter 106.

At 414, various operating conditions may be determined. Operating conditions may include one or more of the following, for example: battery system conditions (voltage, current load, temperature), alternator characteristics, engine ratings (e.g., HP rating, rated engine speed), number of cylinders, fuel type, engine operating conditions (e.g., engine speed, engine airflow, and engine temperature), environmental conditions, and/or system aging.

Once the operating conditions are determined, routine 400 continues to 416 where the desired torque for cranking the engine is determined. For example, the desired alternator torque may be based on the engine speed, battery voltage, and number of cylinders as determined at 514. In one example, the routine may utilize a desired engine speed trajectory during cranking and run-up, and based on an error between the desired trajectory and the actual engine speed trajectory, a desired battery voltage to achieve the desired torque may be evaluated.

At 418 of routine 400, continuous adjustment of voltage boost is performed so that output of the battery 104 is boosted to a desired level. In one example, based on the engine speed error, the controller 102 sends a signal to the DC-to-DC converter 106 to adjust the battery voltage to the desired value as evaluated at 416. The boost may increase the battery voltage to a predetermined value, and in another example, the boost may reduce the battery voltage to a predetermined value.

At 420 of routine 400, continuous adjustment of field shunting and engine cranking torque is performed with boosted voltage. For example, with the boosted voltage passing through the cranking circuit, the load current is generated, the alternator torque increases, and as a result, engine speed increases. In one example, based on the engine speed error or rate of change of speed error or power output of the battery, etc., the controller 102 may adjust a PWM signal to an IGBT to adjust the field shunting resistance.

At 422 of routine 400, an engine speed check is performed. In one example, if the engine speed has reached a predetermined speed, for example about 200 rpm, the controller signals that the engine 112 has completed cranking and the alternator torque supplied to the engine 112 is reduced. If the engine speed is below the predetermined speed, then the engine cranking continues as explained at 420.

In some examples, a first engine speed check may be performed before the engine speed check at 422. In one example, if the engine speed has reached a predetermined speed, for example about 30 rpm, the cranking circuit may desire a lower circuit impedance to maintain the desired load current, and therefore the controller may send a signal to a switching circuit to close a switch and weaken the field via resistor, for example. In such an example, when cranking mode of operation commences, and the switch is open, the load current may be limited by integral resistance of the battery 104 and the field resistance of the traction alternator 120. As cranking proceeds and RPM increases, the traction alternator back EMF limits the load current. Thus, the load current and the torque tend to decrease with increasing speed. A short time after cranking begins, for example when RPM reaches about 30, closing the switch weakens the field resistance, thereby permitting more load current to flow and higher torque to be developed.

Once the engine speed surpasses the threshold, voltage at the traction alternator 120 is reduced at 424 of routine 400. For example, once cranking is complete, the DC power supply from battery is shut down. Further, the alternator torque may not be generated, and the alternator may be switched to an idle or generating mode depending on operating conditions of the off-highway vehicle.

Once the voltage at the traction alternator 120 is reduced, or if it determined at 410 that the engine is in a running mode, routine 400 of FIG. 4 proceeds to 426 where the switching circuit 116 is adjusted (e.g., opened) to disconnect the battery 104 from the active rectifier 134.

At 428 of routine 400, the battery 104 is charged via alternator and rectifier 114. At 430, it is determined if vehicle motion is desired. For example, the vehicle operator may change a gear from Park to Drive. If it is determined that vehicle motion is desired, routine 400 continues to 432 and the traction alternator 120 powers the traction motors 148 to turn the wheels 136 and propel the vehicle. On the other hand, if it is determined that vehicle motion is not desired, the routine ends.

Thus, FIG. 4 shows an example flow chart illustrating a method for operating an engine with voltage boosting. As explained above, voltage boosting can enable the desired variation in alternator torque among a plurality of torque levels during an engine cranking operation.

Figure 5:
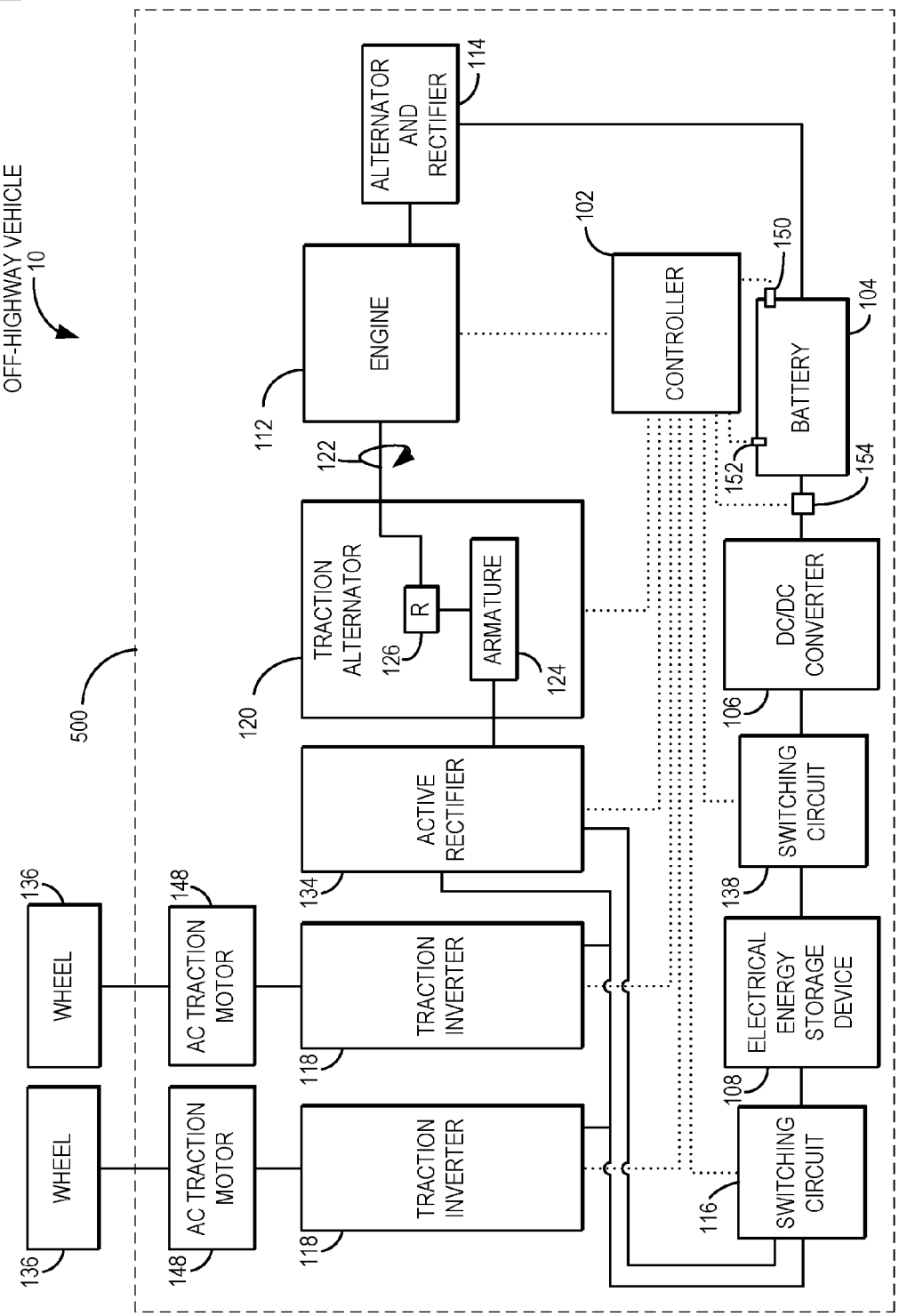
FIG. 5 shows an example block diagram of an engine system in an off-highway vehicle with a secondary energy source that is charged via the engine.

Continuing to FIG. 5, it shows another example embodiment of an engine system 500 with a battery 104 that may be boosted with a DC-to-DC converter 106. Engine system 500 is similar to engine system 100 described above with reference to FIG. 1, for example. The example shown in FIG. 5 further includes a secondary energy source, electrical energy storage device 108. Electrical energy storage device 108 may be an ultracapacitor, for example, or one or more of another suitable high capacity energy storage device that outputs a higher voltage than the battery 104.

In the example of FIG. 5, electrical energy storage device 108 may be isolated from the battery 104 by opening the switching circuit 138. In such an example, electrical energy storage device 108 may be the sole source of energy supplied to the traction alternator 120 to crank the engine. In other examples, both the electrical energy storage device 108 and the battery 104 may be used to supply energy to the traction alternator 120 for engine cranking. For example, by closing switching circuit 138 during the engine starting mode of operation, the life of electrical energy storage device 108 may be extended by the output from battery 104.

Further, in the example embodiment of FIG. 5, during the engine running mode of operation, the electrical energy storage device 108 is charged by the engine 112 via alternator and rectifier 114 and battery 104.

Thus, FIG. 5 shows an embodiment of an engine system which has a secondary energy source (e.g., electrical energy storage device 108), which may be charged by a high voltage source (e.g., the traction alternator 120), in addition to a first energy source (e.g., electric storage battery 104), which is charged by a relatively low voltage source (e.g., alternator and rectifier 114). As described above, both the first energy source and the secondary energy source are charged via the engine 112 when the engine is in a running mode of operation.

Figure 6:
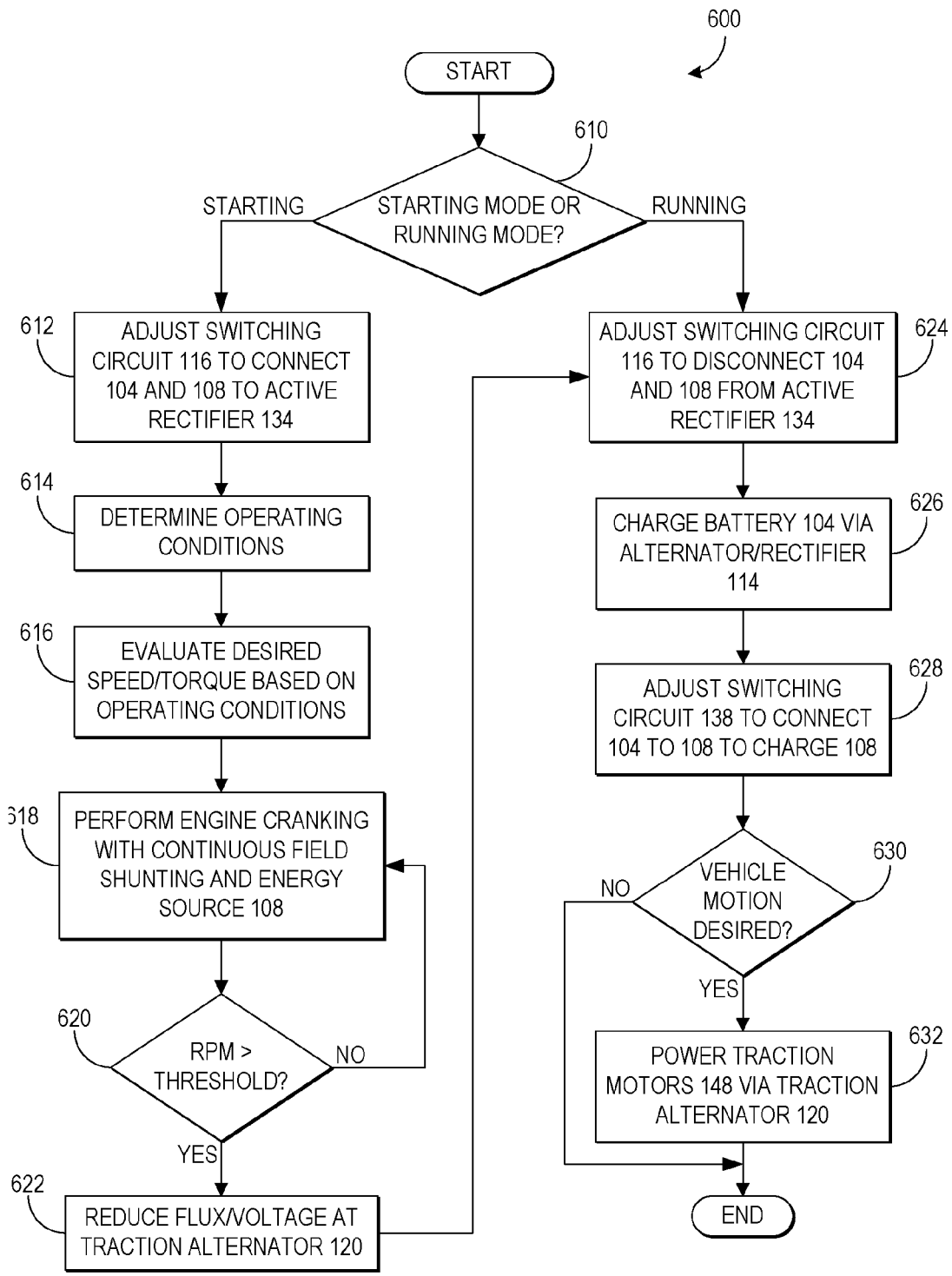
FIG. 6 shows a flow chart illustrating a routine for an engine with a secondary energy source that is charged via the engine.

FIG. 6 shows a flow chart illustrating a control routine 600 for an engine system which includes a secondary storage device, such as engine system 100 of FIG. 5. Specifically, the routine 600 determines an operating mode of the engine and adjusts the circuitry accordingly.

At 610 of FIG. 6, it is determined if the engine is in a starting mode of operation, such as a cranking mode, or a running mode of operation, such as a travelling mode in which the vehicle is propelled. For example, the engine may already be running or it may be shut down. If it is determined that the engine is in a starting mode of operation, routine 600 proceeds to 612 where switching circuit 116 is adjusted to connect electrical energy storage device 108 and battery 104 to active rectifier 134. For example, switching circuit 116 may be closed in order to electrically connect the active rectifier 134 and the electrical energy storage device 108.

Once the switching circuit is adjusted, routine 600 continues to 614 where operating conditions are determined. As described above, the operating conditions may include one or more of the following, for example: battery system conditions (voltage, current load, temperature), alternator characteristics, engine ratings (e.g., HP rating, rated engine speed), number of cylinders, fuel type, engine operating conditions (e.g., engine speed, engine airflow, and engine temperature), environmental conditions, and/or system aging.

Once the operating conditions are determined, routine 600 proceeds to 616 where desired alternator torque is determined. As described above, the desired level of alternator torque may be based on the engine speed, battery voltage, and number of cylinders. In one example, the routine may utilize a desired engine speed trajectory during cranking and run-up, and based on an error between the desired trajectory and the actual engine speed trajectory, a desired torque may be evaluated.

At 618 of routine 600, engine cranking is performed with continuous field shunting, as described above, and electrical energy storage device 108. In some examples, both the boosted battery 104 and the electrical energy storage device 108 may be used to crank the engine. For example, switching circuit 138 may be controlled based on a threshold level of charge of the electrical energy storage device. The threshold level may be close to a maximum charge of the electrical energy storage device 108. In other examples, the threshold level of charge may be additionally or alternatively based on an amount of energy needed to start the engine, for example. If the level of charge of the electrical energy storage device is above the threshold level, the switching circuit may be adjusted such the battery 104 is not electrically coupled to the electrical energy storage device 108, and vice versa.

At 620 of routine 600, an engine speed check is performed. As an example, if the engine speed has reached a predetermined speed, for example about 200 rpm, the controller signals that the engine 112 has completed cranking and the alternator torque supplied to the engine 112 is reduced. If the engine speed is below the predetermined speed, then the engine cranking continues as explained at 618.

If it is determined that the engine speed is greater than the threshold speed at 620, routine 600 proceeds to 622 and the voltage supplied to the traction alternator 120 by the electrical energy storage device 108 is reduced. Further, the alternator torque may not be generated, and the alternator may be switched to an idle or generating mode depending on operating conditions of the off-highway vehicle.

Once the voltage supplied to the traction alternator 120 is reduced or if it is determined that a running mode of operation is desired at 610, routine 600 moves to 624 where switching circuit 116 is adjusted to disconnect electrical energy storage device 108 and the battery 104 (if connected to the electrical energy storage device 108) from the active rectifier. For example, the switching circuit is opened such that the electric energy storage device 108 and the active rectifier are no longer electrically coupled.

At 626 of routine 600, the battery 104 is charged by the engine via alternator and rectifier 114. If it is not already connected, switching circuit 138 is adjusted (e.g., closed) to electrically connect the battery 104 to the electrical energy storage device 108 via the DC-to-DC converter 106. In this manner, the electrical energy storage device 108 is charged by the battery 104 during engine running operation.

At 630 of routine 600, it is determined if vehicle motion is desired. For example, the vehicle operator may change a gear from Park to Drive. If it is determined that vehicle motion is desired, routine 600 continues to 632 and the traction alternator 120 powers the traction motors 148 to turn the wheels 136 and propel the vehicle. On the other hand, if it is determined that vehicle motion is not desired, the routine ends.

Thus, routine 600 shows an example flow chart illustrating a method for operating an engine with voltage boosting and a secondary energy source (e.g., electrical energy storage device 108). As explained above, the secondary energy source can be used to power the traction alternator 120 to crank the engine during the engine starting mode of operation. Further, the engine charges the battery 104 via the alternator 114, and the battery 104, in turn, charges the secondary energy source.

Figure 7:
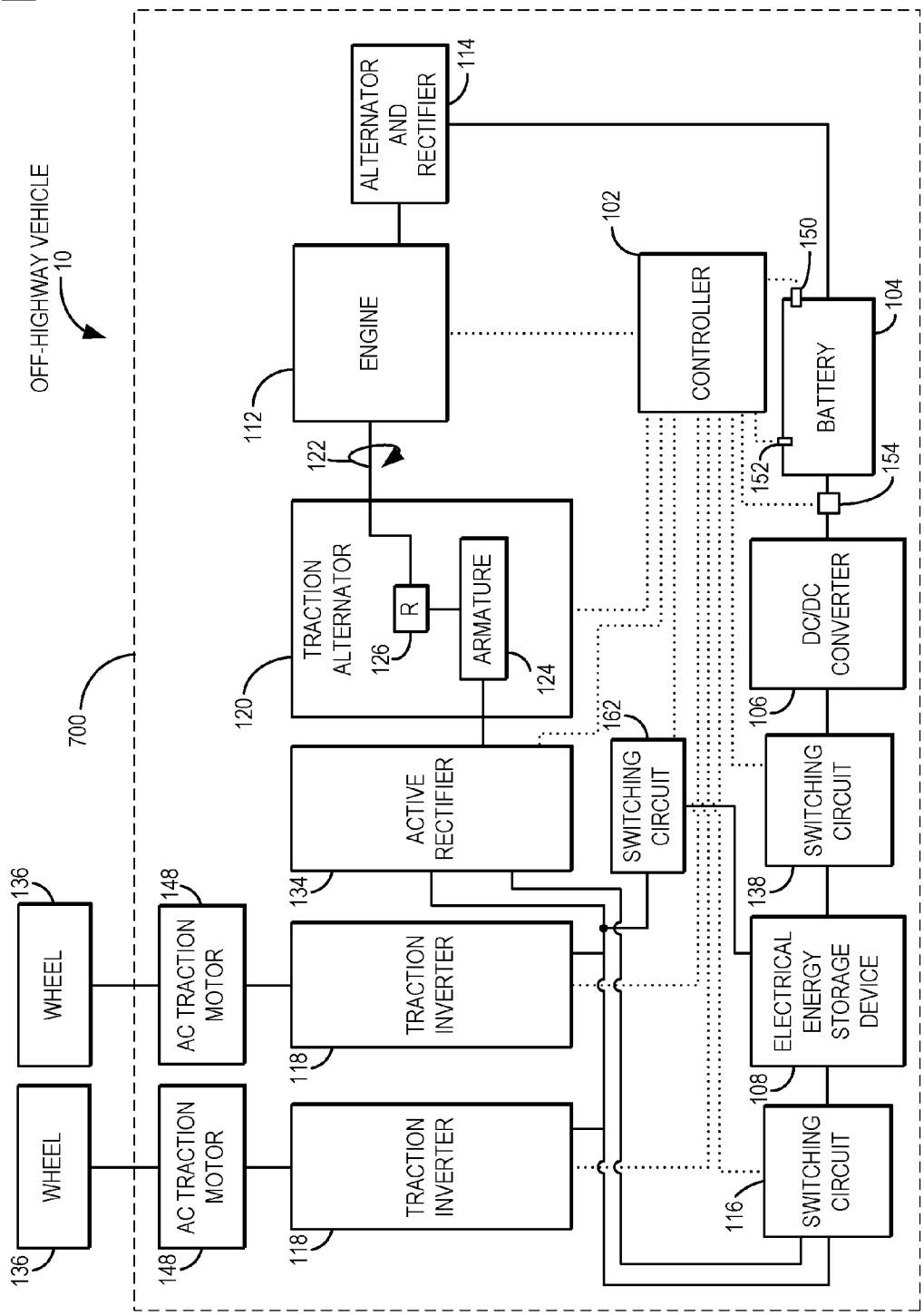
FIG. 7 shows an example block diagram of an engine system in an off-highway vehicle with a secondary energy source that is charged via a traction alternator.

FIG. 7 shows another example embodiment of an engine system 700 that includes a battery 104 (e.g., first energy source) that may be boosted with a DC-to-DC converter 106 and an electrical energy storage device 108 (e.g., secondary energy source). Engine system 700 is similar to engine system 500 described above with reference to FIG. 5, for example. The example illustrated in FIG. 7 further includes a switching circuit electrically coupled between the active rectifier 134 and the electrical energy storage device 108.

As depicted in FIG. 7, battery 104 is charged by the engine via alternator and rectifier 114 by a first voltage when the engine is in a running mode of operation. During the running mode of operation, the switching circuit 138 may be open or closed depending on whether or not charging of the electrical energy storage device 108 via battery 104 is desired. The electrical energy storage device 108 may be further charged at a second, higher voltage by closing switching circuit 162. In such a configuration, AC from the traction alternator 120 is converted to DC by active rectifier 134 and the DC is allowed to flow to the electrical energy storage device 108 when the switching circuit 162 is closed, thus charging electrical energy storage device 108. Further, switching circuit 162 may include voltage limiting circuitry for charging electrical energy storage device 108. For example, switching circuit 161 may include a DC-to-DC converter. In this way, a different voltage may be applied to electrical energy storage device 108 as compared to the traction alternator 120, for example.

Thus, FIG. 7 shows an embodiment of an engine system which has a secondary energy source (e.g., electrical energy storage device 108) in addition to a first energy source (e.g., electric storage battery 104). As described above, both the first energy source and the secondary energy source may be charged via the engine 112 when the engine is in a running mode of operation. Further, the secondary energy source may be charged via the traction alternator 120 when the engine is in a running mode of operation.

Figure 8:
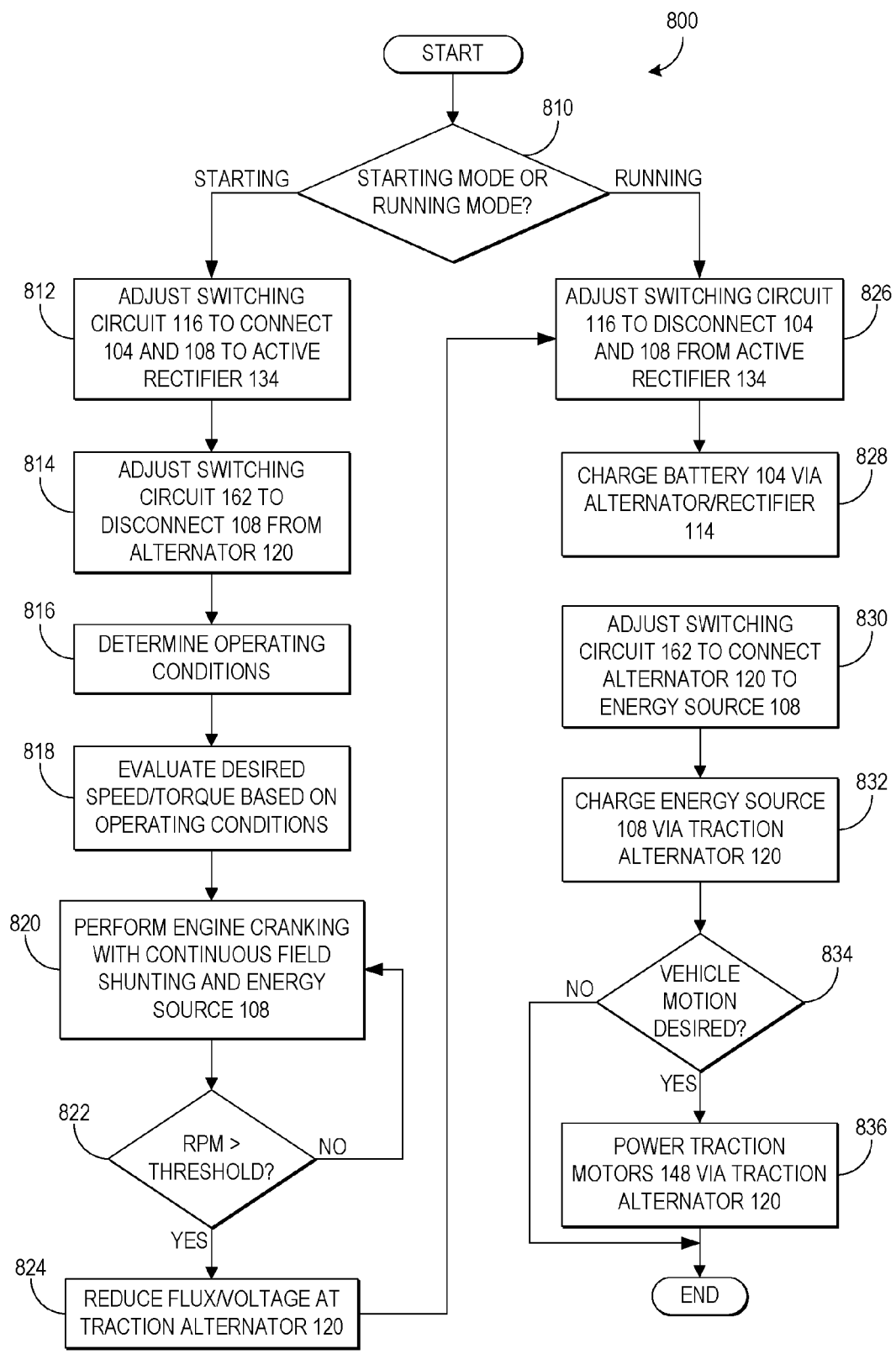
FIG. 8 shows a flow chart illustrating a routine for an engine with a secondary energy source that is charged via a traction alternator.

FIG. 8 shows a flow chart illustrating a control routine 800 for an engine system which includes a secondary storage device which may be charged via a traction alternator, such as engine system 100 of FIG. 5. Specifically, the routine 600 determines an operating mode of the engine and adjusts the circuitry accordingly.

At 810 of FIG. 8, it is determined if the engine is in a starting mode of operation, such as a cranking mode, or a running mode of operation, such as a travelling mode in which the vehicle is propelled. For example, the engine may already be running or it may be shut down. If it is determined that the engine is in a starting mode of operation, routine 800 proceeds to 812 where switching circuit 116 is adjusted to connect electrical energy storage device 108 and battery 104 to active rectifier 134. For example, switching circuit 116 may be closed in order to electrically connect the active rectifier 134 and the electrical energy storage device 108. At 814 of routine 800, switching circuit 162 is adjusted to disconnect the electrical energy storage device 108 from the traction alternator 120. For example, switching circuit may be opened in order to electrically disconnect the traction alternator 120 and the electrical energy storage device 108.

Once the switching circuits 116 and 162 are adjusted, routine 800 continues to 816 where operating conditions are determined. As described above, the operating conditions may include one or more of the following, for example: battery system conditions (voltage, current load, temperature), alternator characteristics, engine ratings (e.g., HP rating, rated engine speed), number of cylinders, fuel type, engine operating conditions (e.g., engine speed, engine airflow, and engine temperature), environmental conditions, and/or system aging.

Once the operating conditions are determined, routine 800 proceeds to 818 where desired alternator torque is determined. As described above, the desired level of alternator torque may be based on the engine speed, battery voltage, and number of cylinders. In one example, the routine may utilize a desired engine speed trajectory during cranking and run-up, and based on an error between the desired trajectory and the actual engine speed trajectory, a desired torque may be evaluated.

At 820 of routine 800, engine cranking is performed with continuous field shunting, as described above, and electrical energy storage device 108. In some examples, both the boosted battery 104 and the electrical energy storage device 108 may be used to crank the engine. For example, switching circuit 138 may be controlled based on a threshold level of charge of the electrical energy storage device. The threshold level may be close to a maximum charge of the electrical energy storage device 108. In other examples, the threshold level of charge may be additionally or alternatively based on an amount of energy needed to start the engine, for example. If the level of charge of the electrical energy storage device is above the threshold level, the switching circuit may be adjusted such the battery 104 is not electrically coupled to the electrical energy storage device 108, and vice versa.

At 822 of routine 800, an engine speed check is performed. As an example, if the engine speed has reached a predetermined speed, for example about 200 rpm, the controller signals that the engine 112 has completed cranking and the alternator torque supplied to the engine 112 is reduced. If the engine speed is below the predetermined speed, then the engine cranking continues as explained at 820.

If it is determined that the engine speed is greater than the threshold speed at 822, routine 800 proceeds to 824 and the voltage supplied to the traction alternator 120 by the electrical energy storage device 108 is reduced. Further, the alternator torque may not be generated, and the alternator may be switched to an idle or generating mode depending on operating conditions of the off-highway vehicle.

Once the voltage supplied to the traction alternator 120 is reduced or if it is determined that a running mode of operation is desired at 810, routine 800 moves to 826 where switching circuit 116 is adjusted to disconnect electrical energy storage device 108 and the battery 104 (if connected to the electrical energy storage device 108) from the active rectifier. For example, the switching circuit is opened such that the electric energy storage device 108 and the active rectifier 134 are no longer electrically coupled.

At 828 of routine 800, the battery 104 is charged by the engine via alternator and rectifier 114. At 830 of routine 800, switching circuit 162 is adjusted (e.g., closed) to connect the electrical energy storage device 108 to the traction alternator 120. As such, the electrical energy storage device 108 is charged by the traction alternator 120 at 832 of routine 800. In some examples, switching circuit 138 may be adjusted (e.g., closed) to electrically connect the battery 104 to the electrical energy storage device 108 via the DC-to-DC converter 106 such that the electrical energy storage device 108 is charged by both the battery 104 and the traction alternator 120 during engine running operation.

At 834 of routine 800, it is determined if vehicle motion is desired. For example, the vehicle operator may change a gear from Park to Drive. If it is determined that vehicle motion is desired, routine 800 continues to 836 and the traction alternator 120 powers the traction motors 148 to turn the wheels 136 and propel the vehicle. On the other hand, if it is determined that vehicle motion is not desired, the routine ends.

Thus, routine 800 shows an example flow chart illustrating a method for operating an engine with voltage boosting and a secondary energy source (e.g., electrical energy storage device 108) which is charged by the traction alternator 120. As explained above, the secondary energy source can be used to power the traction alternator 120 to crank the engine during the engine starting mode of operation. Further, the engine charges the battery 104 via the alternator 114, and the battery 104 may also charge the secondary energy source.

Figure 9:
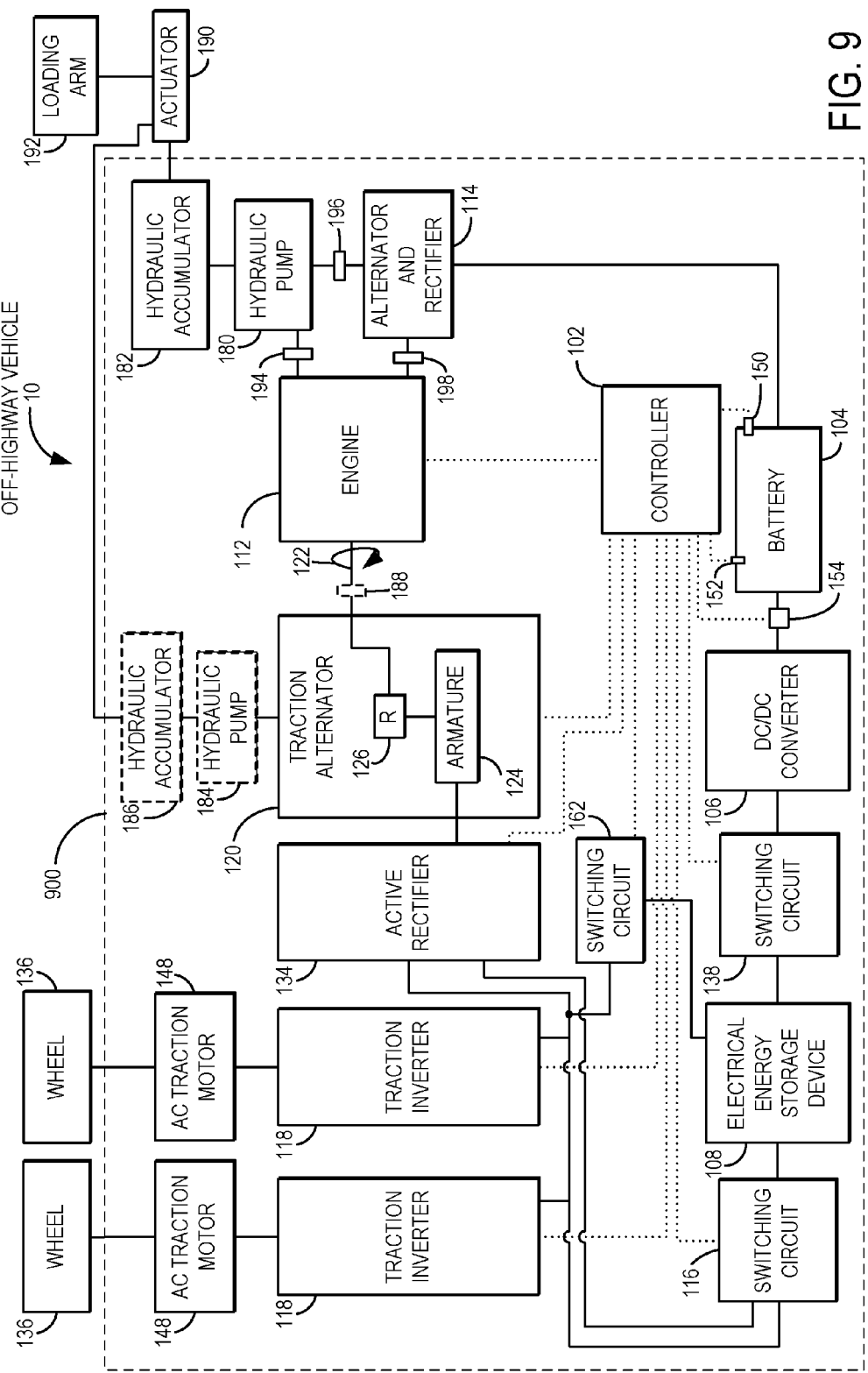
FIG. 9 shows an example block diagram of an engine system in an off-highway vehicle with a secondary energy source and a hydraulic system.

FIG. 9 shows another example embodiment of an engine system 900 that includes a battery 104 (e.g., first energy source) that may be boosted with a DC-to-DC converter 106 and an electrical energy storage device 108 (e.g., secondary energy source) which may be charged via a traction alternator 120. Engine system 900 is similar to engine system 700 described above with reference to FIG. 7, for example. The example illustrated in FIG. 9 further includes a hydraulic system which includes a hydraulic pump 180, a hydraulic accumulator 182, and an actuator 190. The hydraulic system may control lifting of a loading arm 192 of the off-highway vehicle 10, for example.

As shown in the example illustrated in FIG. 9, the hydraulic pump 180 is mechanically coupled to the engine 112 via a clutch 194 and mechanically coupled to the alternator and rectifier 114 via a clutch 196. During an engine running mode of operation, for example, clutch 194 between the engine 112 and hydraulic pump 180 is engaged such that the hydraulic pump 180 is powered by the engine, and clutch 198 between the engine 112 and the alternator and rectifier 114 may be engaged so that the engine supplies energy to charge the battery 104. During an engine starting mode of the engine, clutch 194 may be disengaged, clutch 198 may be disengaged, and clutch 196 between the hydraulic pump 180 and alternator and rectifier 114 may be engaged such that energy from the hydraulic system may be used to charge the battery 104. For example, when clutch 196 is engaged, a valve may be opened to release hydraulic oil from the hydraulic accumulator 182 back to the hydraulic pump 180. The high pressure hydraulic oil from the hydraulic accumulator 182 may cause hydraulic pump 180 to rotate thereby generating a current in alternator and rectifier 114 which is sent to the battery 104.

Alternatively, a hydraulic pump 184 and hydraulic accumulator 186 may be mechanically coupled to traction alternator 120. In such a configuration, traction alternator 120 provides power to control the hydraulic system to actuate the loading arm 192 via actuator 190. Further a clutch 188 may be provided between the engine 112 and the traction alternator 120 such that in a starting mode of operating, before engine cranking begins, the traction alternator 120 can be decoupled from the engine and energy from the hydraulic system may be supplied to the electrical energy storage device 108 when switching circuit 162 is closed. The engine is then started by supplying energy from electrical energy storage device 108 to active rectifier 134 and traction alternator 120.

Thus, FIG. 9 shows an embodiment of an engine system which has a secondary energy source (e.g., electrical energy storage device 108) in addition to a first energy source (e.g., electric storage battery 104) as well as a hydraulic system for controlling at loading arm 192 of the off-highway vehicle 10. As described above, in addition to controlling the loading arm 192, the hydraulic system may be used to charge the first energy source and/or the secondary energy source based on the location of the hydraulic system.

Figure 10:
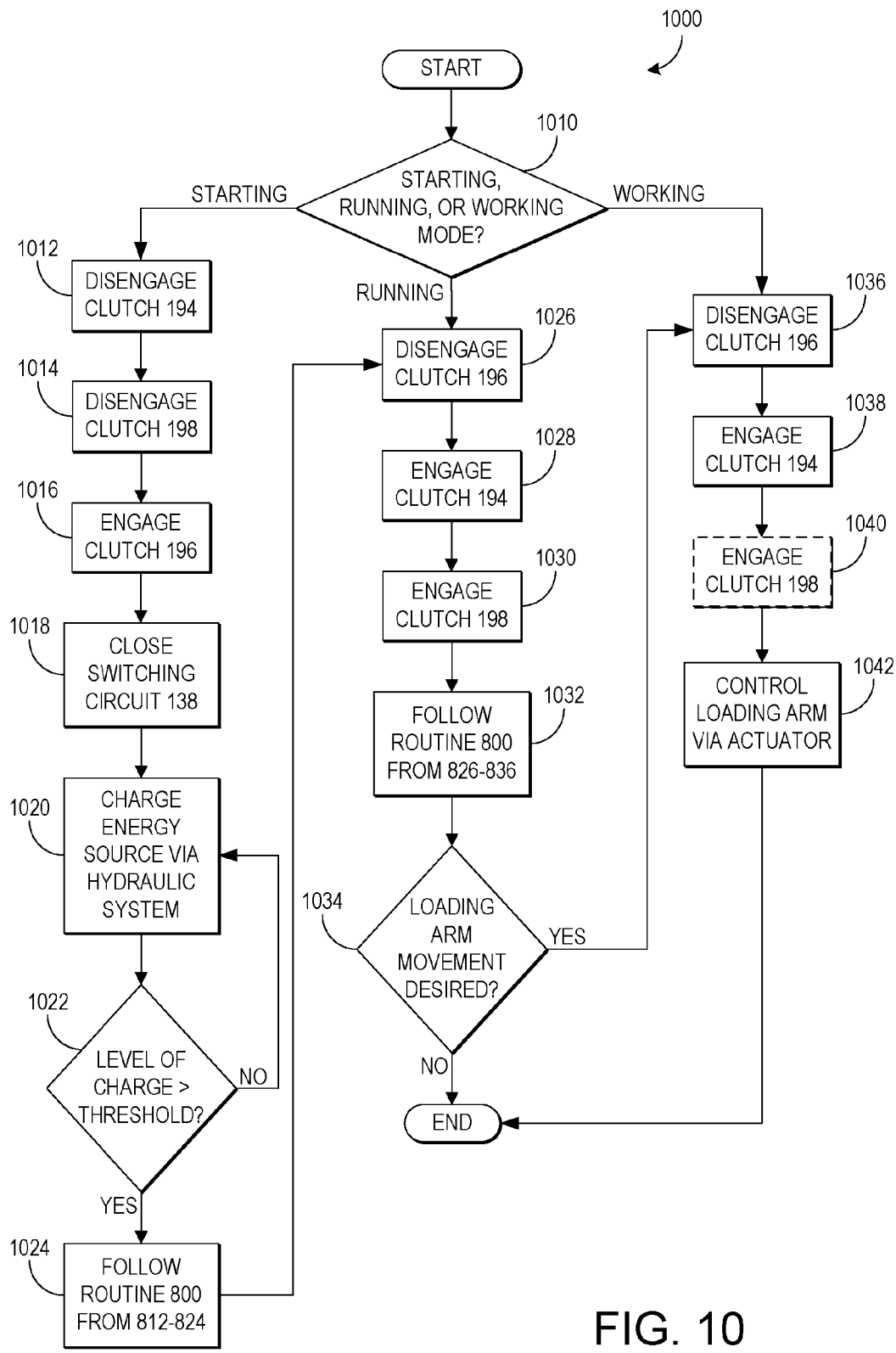
FIG. 10 shows a flow chart illustrating a routine for an engine with a secondary energy source and a hydraulic system.

FIG. 10 shows a flow chart illustrating a control routine 1000 for an engine system which includes a secondary storage device and a hydraulic system, such as engine system 900 of FIG. 9. Specifically, the routine 1000 determines an operating mode of the engine and adjusts the circuitry accordingly.

At 1010 of routine 1000, it is determined if the engine is in a starting mode of operation, such as a cranking mode, a running mode of operation, such as a travelling mode in which the vehicle is propelled, or a working mode of operation, such as when a loading arm is in use. For example, the engine may already be running or it may be shut down. The engine may be in the working mode and the running mode simultaneously. For example, the engine may be running in an idle state while the loading arm is moving so that the hydraulic system has power but the vehicle is not propelled.

If it is determined that the engine is in the starting mode of operation, routine 1000 proceeds to 1012 where clutch 194 is disengaged. In this way, the hydraulic system is no longer mechanically coupled to the engine 112. At 1014 of routine 1000, clutch 198 is disengaged so that the alternator and rectifier 114 is no longer mechanically coupled to the engine 112. At 1016 of routine 1000, clutch 196 is engaged. In this way, the hydraulic system is mechanically coupled to the alternator and rectifier 114. As such, energy from the hydraulic pump 180 can be used to generate a current in the alternator and rectifier 114. In the embodiment in which the hydraulic system is coupled to the traction alternator 120, clutch 188 may be disengaged such that the traction alternator is no longer mechanically coupled to the engine, and hydraulic pump 184 may generate power in the traction alternator 120.

At 1018 of routine 1000, switching circuit 138 is closed such that battery 104 is electrically coupled to electrical energy storage device 108 and battery 104 may charge electrical energy storage device 108 via DC-to-DC converter 106. In the embodiment in which the hydraulic system is coupled to traction alternator 120, switching circuit 162 may be closed such that the traction alternator 120 is electrically coupled to the electrical energy storage device 108. Switching circuit 162 may contain voltage control circuitry (e.g., a DC-to-DC converter) so that electrical energy storage device 108 can be charged at a different voltage than an output voltage from traction alternator 120, for example.

At 1020 of routine 1000, battery 104 is charged by the hydraulic system, and because switching circuit 138 is closed, the electrical energy storage device 108 may also be charged. As described above, the current generated in the alternator and rectifier 114 is directed to the battery 104. In this manner, battery 104 and electrical energy storage device are charged. In the embodiment in which the hydraulic system is coupled to the traction alternator 120, current generated in the traction alternator 120 is directed to the electrical energy storage device 108 when the switching circuit 162 is closed. In this way, the electrical energy storage device 108 is charged.

At 1022 of routine 1000, it is determined if a level of charge of the electrical energy storage device 108 is greater than a threshold level of charge. The threshold level of charge may be an amount of charge needed to supply an appropriate torque to crank the engine, for example. If it is determined that the level of charge is less than the threshold level, routine 1000 returns to 1020 and the hydraulic system continues to charge the energy source.

On the other hand, if it is determined that the level of charge is greater than the threshold level, routine 1000 continues to 1024 and routine 800 of FIG. 8 is carried out from 812 to 824, as described above. In this way, the circuitry is adjusted such that the engine may be started by the traction alternator 120, as described above with reference to FIG. 8. In the embodiment in which the hydraulic system is coupled to the traction alternator 120, clutch 188 is engaged once the level of charge of the electrical energy storage device 108 reaches the threshold level of charge so that the traction alternator 120 may crank the engine at 1022.

Once the engine is started, or if it is determined that the engine is in the running mode of operation at 1010, routine 1000 continues to 1026 where clutch 196 is disengaged such that the hydraulic pump 180 is not longer mechanically coupled to the alternator and rectifier 114. At 1028 of routine 1000, clutch 194 is engaged. In this way, the engine 112 is mechanically coupled to the hydraulic system such that it may power the hydraulic system. At 1030 of routine 1000, clutch 198 is engaged such that the engine 112 is mechanically coupled to the alternator and rectifier 114 and the engine provides energy to charge the battery 104.

At 1032 of routine 1000, routine 800 of FIG. 8 is carried out from 826 to 836, as described above. In this way, the circuitry is adjusted such that the engine is running and the electrical energy storage device 108 is charged by the traction alternator 120 and battery 104 is charged by the alternator and rectifier 114, as described above with reference to FIG. 8.

At 1034 of routine 1000, it is determined if loading arm 192 movement is desired. In some examples, the loading arm may be controlled by an operator of the off-highway vehicle, for example. In one example, the off-highway vehicle may be in a Park gear so that the vehicle is not propelled while the loading arm 192 is moving. If it is determined that loading arm 192 movement is not desired, routine 1000 ends.

On the other hand, if loading arm 192 movement is desired or if it is determined that the engine is in a working mode of operation, routine 1000 moves to 1036 where clutch 196 is disengaged so that the hydraulic system is not coupled to the alternator and rectifier 114. At 1038 of routine 1000, clutch 194 is engaged to mechanically couple the engine 112 and the hydraulic pump 180 such that the engine 112 can provide power to the hydraulic system. At 1040 of routine 1000, clutch 198 may be engaged to mechanically couple the engine 112 to alternator and rectifier 114 if charging of the battery 104 is desired. For example, it may be desired to charge the battery 104 in the working mode of operation if a level of charge of the battery 104 is less than a threshold level.

At 1042 of routine 1000, movement of the loading arm 192 is controlled via the actuator 190. For example, based on a desired motion of the loading arm 192, actuator 190 is adjusted via the hydraulic pump 180 and the hydraulic accumulator 182 to move the loading arm 192.

Thus, routine 1000 shows an example flow chart illustrating a method for operating an engine with voltage boosting, a secondary energy source (e.g., electrical energy storage device 108) which is charged by the traction alternator 120, and a hydraulic system. As explained above, the hydraulic system can be used to charge the battery and the secondary energy source during the engine starting mode of operation.

Figure 11:
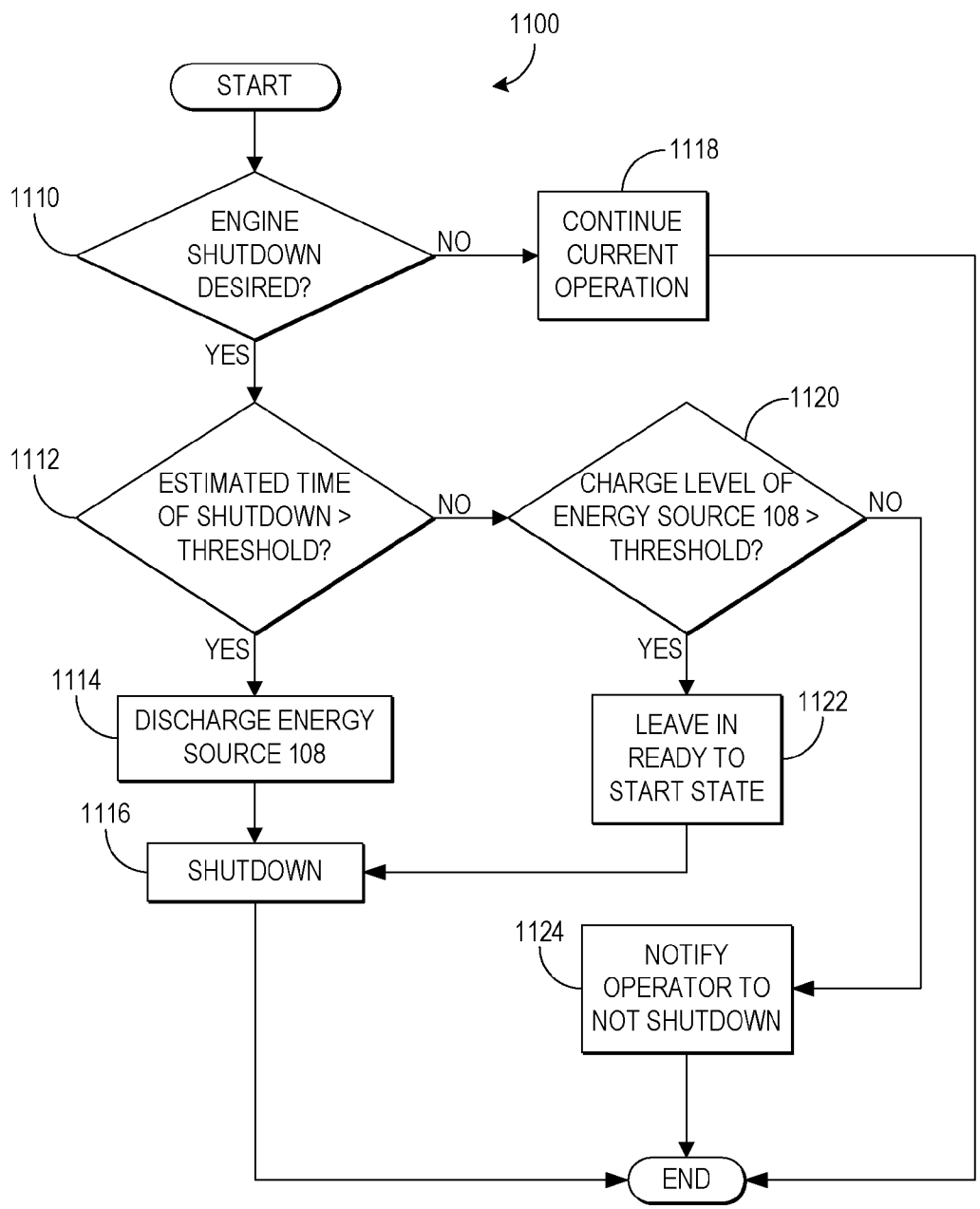
FIG. 11 shows a flow chart illustrating a shut down routine for an engine system in an off-highway vehicle with a secondary energy source.

FIG. 11 shows a flow chart illustrating a control routine 1100 for shutting down an engine system, such as any of the engine systems described above with reference to FIGS. 1-3, 5, 7, and 9. Specifically, the routine 1100 determines if an engine shut down is desired and controls the shut down based on conditions of the energy storage devices.

At 1110 of FIG. 11, is it determined if an engine shut down is desired. For example, it may be indicated that an engine shut down is desired if the vehicle operator turns the key to an off position in the ignition. If it is determined that an engine shut down is not desired, routine 1100 moves to 1118 and current engine operation is continued and the routine ends.

On the other hand, if it is determined that engine shut down is desired, routine 1100 proceeds to 1112 where it is determined if an estimated time of engine shut down is greater than a threshold time. For example, the vehicle operator may have the option to turn the key to various positions based on an estimated time of shut down. In some examples, the threshold time may be a predetermined time, such as 24 hours. In other examples, the threshold time may be based on a state of health of the battery. For example, if the battery is degraded and is losing charge relatively quickly, for example, the threshold time may be less than a situation in which the battery is not degraded.

If it is determined that the estimated time of shut down is greater than the threshold time, routine 1100 continues to 1114 and the electrical energy storage device 108 (e.g., secondary energy source) is discharged. Once the energy source is discharged, routine 1100 proceeds to 1116 and the engine is shut down.

In contrast, if it is determined that the estimated time of shut down is less than the threshold time at 1112, routine 1100 moves to 1120 where it is determined if the charge level of the energy source is greater than a threshold level. For example, the threshold charge level may be based on an amount of energy needed to crank the engine.

If it is determined that the level of charge is greater than the threshold level, routine 1100 continues to 1122 and the electrical energy storage device 108 is left in the ready to start state (e.g., the energy source is not discharged). Next, routine 1100 moves to 1116 and the engine is shut down. In this way, a charge level of the electrical energy storage device 108 is substantially maintained and the electrical energy storage device 108 will be ready to crank the engine during a subsequent start of the engine.

On the other hand, if it is determined that the charge level of the electrical energy storage device 108 is less than the threshold level, routine 1100 moves to 1124 and the vehicle operator is notified that the engine should not be shut down. For example, an indicator may be displayed on a dashboard of the vehicle which notifies the vehicle operator of the low state of charge.

In examples where the engine is shut down and the energy source is discharged or the charge level of the energy source is less than the threshold level, the vehicle operator may have to wait for a length of time corresponding to the time needed for the battery 104 to charge the electrical energy storage device 108, for example. As an example, the time for the battery 104 to charge the secondary storage device may be similar to a pre-lube time in which a pump pressurizes an oil system of the engine (e.g., 10 seconds). As another example, if a charge level of the battery 104 is low during engine starting, it may be charged via the hydraulic system, as described above with reference to FIGS. 9 and 10.

In this manner, shut down of an engine may be controlled based on an estimated length of time the vehicle will be shut down. Control of engine shut down may further be based on a charge level of the secondary storage device (e.g., electrical energy storage device 108).

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of operating an engine, the engine coupled to a traction alternator for vehicle travelling and an auxiliary alternator, comprising:
   in an off-highway vehicle running mode of operation, charging a battery at a first voltage from the auxiliary alternator while supplying current from the traction alternator to a traction motor to propel the vehicle; and
   in a starting mode of operation, generating a second, higher voltage, from stored energy, to drive the traction alternator to at least assist in starting the engine.

2. The method of claim 1, wherein the stored energy is stored electrical energy at the first voltage stored in the battery, and the second, higher voltage is generated through a DC-to-DC converter.

3. The method of claim 1, wherein the stored energy is stored electrical energy at the second voltage stored in a secondary electrical energy storage device.

4. The method of claim 1, wherein in the running mode of operation, current is supplied by a traction inverter to the traction motor to propel the vehicle, and during the starting mode of operation, current is supplied at the second voltage to the traction inverter to drive the traction alternator.

5. A method of operating an engine, the engine coupled to a traction alternator for vehicle travelling, comprising: in an off-highway vehicle running mode of operation, supplying current from the traction alternator to a traction motor to propel the vehicle; and in a starting mode of operation, supplying stored energy from a first energy source and a secondary energy source to the traction alternator to start the engine, wherein the first energy source is a battery that outputs a lower voltage than the secondary energy source, and further comprising, during the running mode of operation, charging the battery via an auxiliary alternator mechanically coupled to the engine.

6. The method of claim 5, wherein the traction alternator is a three-phase alternator.

7. The method of claim 6, further comprising, during the starting mode of operation, adjusting torque supplied to the engine by continuous adjustment of a field shunting of the traction alternator.

8. The method of claim 6, further comprising, during the starting mode of operation, adjusting torque supplied to the engine by adjusting DC voltage supplied to an inverter coupled to the traction alternator.

9. The method of claim 5, wherein output supplied by the first energy source is boosted via a DC-to-DC converter.

10. The method of claim 5, wherein current is supplied to the traction alternator from the secondary energy source via a traction inverter, and wherein current supplied to the traction motor from the traction alternator is supplied via the traction inverter.

11. The method of claim 5, wherein current is supplied to the traction alternator from the secondary energy source via an active rectifier.

12. The method of claim 5, wherein current is supplied to the traction alternator from the secondary energy source via an inverter that is separate from a traction inverter which supplies current from the traction alternator to the traction motor.

13. The method of claim 5, wherein the engine is further coupled to a hydraulic system including a hydraulic pump, hydraulic accumulator, and a hydraulic actuator.

14. The method of claim 13, further comprising, in a working mode of operation, supplying power from the engine to the hydraulic system for lifting a working arm mechanically coupled to the vehicle.

15. The method of claim 13, further comprising, in the starting mode of operation, decoupling the hydraulic system from the engine via a clutch, and charging the first energy source by electrically coupling the hydraulic system to the first energy source via an auxiliary alternator.

16. A method of operating an engine in an off-highway vehicle, the engine coupled to a traction alternator and an auxiliary alternator, comprising:
   in a running mode of operation, supplying a traction motor with current from the traction alternator via a traction inverter, charging a first energy source via the auxiliary alternator, and charging a secondary energy source via the traction alternator; and
   in a starting mode of operation, directing output from the first energy source through a DC-to-DC converter and to the secondary energy source before directing output of the secondary energy source to the traction alternator to assist in cranking the engine, the secondary energy source outputting a higher voltage than the secondary energy source.

17. The method of claim 16, wherein the first energy source is a battery, and the battery is coupled to the secondary energy source via a switching circuit.

18. The method of claim 17, further comprising, during the starting mode of operation, adjusting the switching circuit to disconnect the battery from the secondary energy source when a level of charge of the secondary energy source is greater than a threshold level.

19. The method of claim 16, wherein the traction alternator is electrically coupled to the traction inverter via an active rectifier.

20. The method of claim 16, further comprising, during the starting mode of operation, supplying current to the first energy source via a hydraulic system electrically coupled to the auxiliary alternator, the hydraulic system including a hydraulic pump, a hydraulic accumulator, and a hydraulic actuator.

21. The method of claim 16, further comprising, during an engine shut down, discharging the secondary energy source if an estimated time of engine shut down is greater than a threshold, and not discharging the secondary energy source if the estimated time of engine shut down is less than the threshold.

22. A system for an off-highway vehicle, comprising:
an engine;
an auxiliary alternator mechanically coupled to the engine;
a traction alternator mechanically coupled to the engine;
a battery electrically coupled to the engine;
a secondary energy storage system electrically coupled to the engine, the secondary energy storage system outputting a higher voltage than the battery;
a hydraulic system which includes a hydraulic accumulator; and
a controller for operating the auxiliary alternator to charge the battery during a running mode of operation; the controller operating the traction alternator to charge the secondary energy storage system during the running mode of operation; the controller operating the hydraulic accumulator to charge the battery during a working mode of operation; and the controller operating the battery and the secondary energy storage system to supply current to the traction alternator to start the engine during a starting mode of operation.

23. The system of claim 22, wherein the traction alternator is a three-phase alternator, and wherein the controller adjusts torque supplied to the engine by continuous adjustment of a field shunting of the traction alternator during the starting mode of operation.

24. The system of claim 22, wherein an output of the battery is boosted by a DC-to-DC converter, and wherein the controller estimates a state of health of the battery.

* * * * *